May 15, 1945.                R. A. A. WILLENS                2,375,878
                              CALCULATING DEVICE
                    Filed July 5, 1941           2 Sheets-Sheet 1

INVENTOR
R.A.A. WILLENS
BY
ATTORNEYS

May 15, 1945.  R. A. A. WILLENS  2,375,878
CALCULATING DEVICE
Filed July 5, 1941  2 Sheets-Sheet 2
FIG. 6
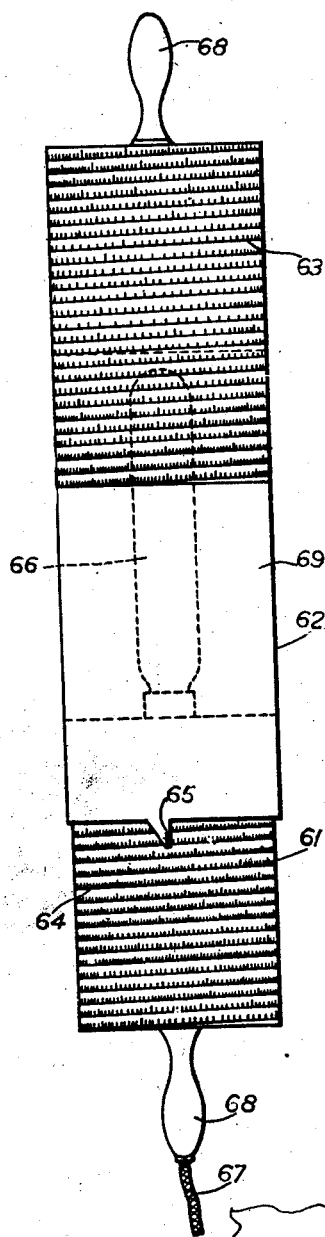
FIG. 7
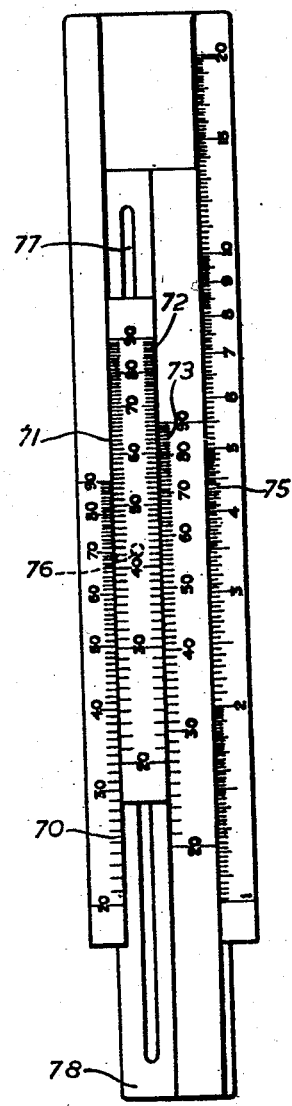
FIG. 6(a)
FIG. 8
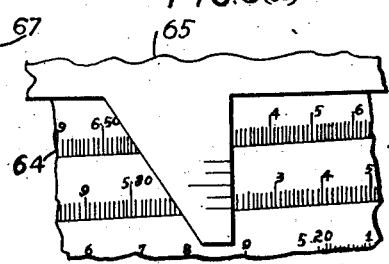
INVENTOR
R.A.A. WILLENS
BY
ATTORNEYS Patented May 15, 1945

2,375,878

UNITED STATES PATENT OFFICE 2,375,878

CALCULATING DEVICE

Robert Alfred Archibald Willens, London, England, assignor to Celanese Corporation of America, a corporation of Delaware Application July 5, 1941, Serial No. 401,240
In Great Britain August 2, 1940

11 Claims. (Cl. 235—71)

This invention relates to calculating devices and is particularly concerned with devices for solving problems of the type exemplified in the selection of change-gear wheels in machine tools.

One arrangement for changing the speed ratio between a driving and a driven shaft in machine tools comprises the provision of a range of gear wheels of all numbers of teeth from a minimum to a maximum, and the fitting of four gear wheels selected from the range to the machine, one to the driving shaft, one to the driven shaft, and two to an intermediate shaft to engage respectively with the gear wheels on the driving and driven shafts. By these means, with quite a modest range of gears, an enormous number of possible speed ratios between the driving and driven shaft may be obtained, the number of ratios available being little short of a quarter of the fourth power of the number of gears in the range. Difficulty arises, however, in selecting the best set of four gears from the range to give any desired ratio. Short of examining separately the enormous number of possible ratios, or of arranging them in order of magnitude for the purposes of selecting one close to the desired magnitude, there appears to be no method at present known whereby the best set of gears may be selected. Since several millions of possible gear ratios may easily be involved, e. g. with a range of 70 possible gear wheels, the task of evaluating and tabulating the possible compound ratios available is too great to be undertaken. It is the purpose of the present invention to provide a device whereby the problem outlined above, and other problems involving similar considerations may be readily solved in a short time.

In general, the problem to be solved may be expressed as the selection of a plurality (at least three) of values from a range of a finite number of distinct values to provide a given function of that plurality of values which shall most nearly approximate to a value selected from a finite and continuous range. Thus in the particular problem of change-gears involving four gear wheels, there are four integral values (the numbers of teeth for the four gears) to be selected from a given range, of which values the product of two divided by the product of the other two shall approach as nearly as possible to a given desired value. If, e. g. for reasons of machine design, the size of one of the gears of the train is fixed, there are only three integral values to select, and, though the problem is simpler, it may still be too laborious to solve it by mere inspection.

It has been found that the problem may be simplified by finding two sub-functions, each involving some only of the variables to be selected, which sub-functions may be combined to form the desired function of all the variables or some other function that is in one-one relationship with the desired function. Thus in the particular problem involving four gear wheels, two sub-functions that may be selected are respectively the algebraic sum of the logarithms of the number of teeth of any two gears of the compound train (the second and fourth gear of the train being regarded as having negative logarithms since an increase in them decreases the compound ratio) and the algebraic sum of the logarithms of the number of teeth of the other two gears, these two functions being combined by simple addition to give the logarithm of the desired compound ratio. For this purpose, the first and second gears of the train may be paired, and the third and fourth, or (and preferably) the first and third and the second and fourth; in the latter case the result of the addition may be regarded as finding the difference (instead of the sum) of the arithmetic (instead of algebraic) sums of the logarithms of the numbers of teeth in the gears.

According to the present invention, an apparatus for facilitating the selection of at least three values each from a range of a finite number of distinct values to provide a given function of the values selected which shall approximate most closely to a desired value lying in a finite and continuous range, comprises means for presenting in juxtaposition two scales marked in accordance with every possible value of two sub-functions of the variables to be selected, some of the variables being involved in the sub-function of one scale and the remainder in that of the other, and means for adjusting the juxtaposition in such a way that if two values, one from each of said juxtaposed scales, involve values to be selected which will provide a function of the desired value, these two values will coincide in the juxtaposed scales. Thus for the particular problem of selecting at least two pairs of gear wheels from a range of gears to give a compound gear ratio approximating as closely as possible to a desired ratio, the apparatus may comprise two scales, each marked at distances from a datum equal, in one case to the algebraic sum of the logarithms of every possible combination of at least two gears from said range, and in the other to the algebraic sum of the logarithms of every possible combination of the remaining number of gears required, means for juxtaposing said scales so that marks in one scale may coincide with marks in the other, and means for relatively displacing said scales by an amount equal to the logarithm of the desired ratio, whereby any pair of marks that coincide, one in each scale, correspond to a plurality of gears giving the desired compound gear ratio. For the purpose of relatively displacing the scales so that they are out of register with one another by a distance equal to the logarithm of the compound gear ratio required, one or both of the scales referred to above may be provided with a simple logarithmic scale beginning (log 1=0) opposite the mark representing the square of the lowest number of gear teeth in the range. The two juxtaposed scales being displaced in this manner, any two marks, one on each scale, that coincide represent two pairs of gears which together give the desired ratio. If there is no exact coincidence, the pair of marks nearest to one another gives the nearest approximation to the desired ratio.

For the purpose of examining the juxtaposed scales it is generally convenient to make the scales opaque with transparent scale marks, so that any coincidence of marks on the two scales with one another may easily be perceived by the transmission of light through both scales. In this way the attention may more easily be drawn by the light showing only through coincident scale marks than by the coincidence of two opaque marks on an opaque or transparent ground.

Since with relatively few available gears a very large number of gear ratios may be obtained, and in consequence a very close approximation to any desired compound ratio, the best use can only be made of the device if the displacement of the two scales relatively to one another can be adjusted with a very high degree of accuracy. For this purpose the simple logarithmic scale marking the compound gear ratio required needs to be very long, and a straight and rigid scale is generally too unwieldy for the purpose. According to a further feature of the present invention, however, the scales may be provided on flexible strips, e. g. of metal, or preferably of film. Such strips may be coiled on reels and unwound together, one in lead of the other by an amount necessary to give the required displacement between the scales. In order to avoid difficulties arising from stretching or shrinking of film material, ordinary cinematographic film may be employed, and the perforations provided at the edges thereof may be made use of to keep the scales always in the correct relationship. Thus, if the scales are initially marked on the films against the perforations employed as a standard, any shrinkage or stretching of the film becomes irrelevant except insofar as it affects the distance between the point at which the film is engaged by a sprocket whose teeth enter the perforations and the point at which the two films are superposed for examination. This distance may be made very short, and any difficulty from stretching or shrinkage of the film substantially removed. An alternative method of providing long superposable scales that can easily be examined, is to form them as helices on cylinders, e. g. as a helical series of perforations in a sheet metal cylinder, one cylinder being a close fit inside the other so that the scales on the cylinders are superposed in any desired relationship.

The apparatus broadly outlined above may be elaborated so as to perform its function repeatedly. Thus, instead of two scales each representing the product of two gears, four scales each representing a single gear may be employed, the ratio required being represented as a displacement between the first and last scales, while the second and third scales, juxtaposed respectively against the first and fourth, are fixed with reference to one another. Then simultaneous coincidences between the first and second scales and the third and fourth that may occur in any position of the second and third scales with reference to the other two must be observed. While the simultaneous observation by eye of two such coincidences may be difficult, it may be effected by means of a pair of photoelectric cells each adapted to be rendered electrically conducting when exposed to light. If the cells are arranged in series and exposed respectively to any light passing through the juxtaposed first and second scales and the juxtaposed third and fourth they will only pass a current when on sliding the one pair of scales (e. g. the second and third) relatively to the other, a simultaneous coincidence on both pairs of scales occurs and this current may be used to stop the motion of the scales, and/or to attract the attention of the operator, who will then observe the coincidences.

While the particular application of the invention described above relates to compound gear ratios given by four gears it is evident that ratios given by any greater number of gears may be selected by similar means. For example where six gears are employed the apparatus for selecting them may comprise two scales each representing every possible product of the numbers of teeth in three gears.

By way of example, three forms of apparatus according to the invention will now be described in greater detail with reference to the accompanying drawings in which:

Figure 6 is a side elevation of a further form of apparatus according to the invention;

Figure 6a is an enlarged view of a detail of Figure 6;

Figure 7 shows a third form of apparatus according to the invention; and

Figure 8 is a section through the apparatus of Figure 7.

Figure 1:
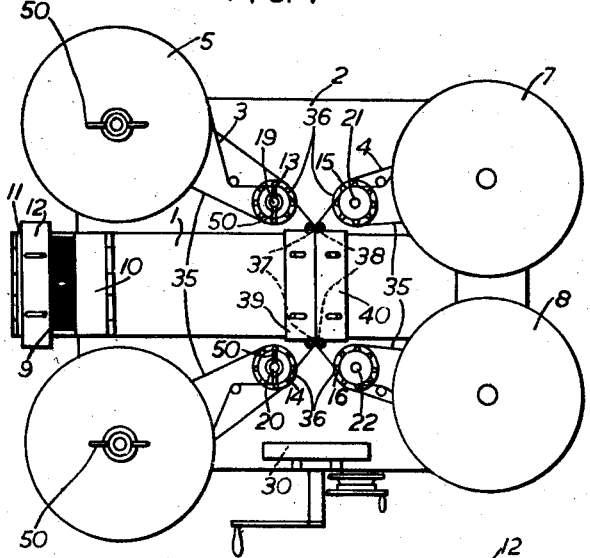
Figure 1 is a plan view of one form of apparatus.

The apparatus shown in Figure 1 comprises essentially a conventional type of film viewer indicated at 1, mounted on a base board 2, and adapted for viewing simultaneously two films 3, 4. Four film reels 5, 6, 7, 8 are provided, two for each of the films 3, 4, each film being run continuously from one reel (5 or 7) to the other (6 or 8). The apparatus is without the usual shutter arrangement, the films being run continuously through the viewer and providing a continuously moving image on the screen 9 of the device. The screen 9 is partly masked by two hinged flaps 10, 11, the latter of which is provided with an auxiliary sliding mask 12, for a purpose hereinafter to be described. The flaps 10, 11 are shown in the "down" position in Figure 1 and in the raised position in Figure 3, flap 11 being raised to a vertical position so that it is seen edge-on while the flap 10 is swung past the vertical position so that its undersurface is visible in Figure 3.

Figure 2:
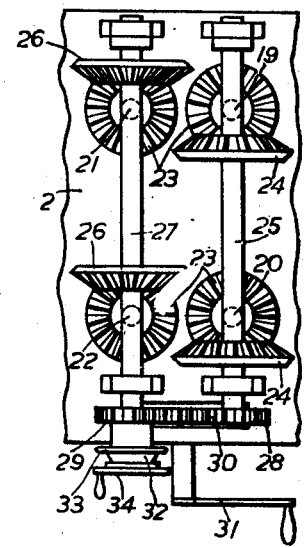
Figure 2 is an inverted plan of a detail of Figure 1.

The films 3, 4 are each driven by a pair of sprockets 13, 14; 15, 16, mounted on spindles 19, 20; 21, 22, respectively. Each pair of sprockets, 13, 14 or 15, 16, is capable of being driven in either direction, the two pairs working separately or in accurately geared relationship to one another. This is effected by the means shown in the inverted plan view of Figure 2. The spindles 19—22 carry at their lower ends bevel gears 23, the gears on the spindles 19, 20 engaging with bevel gears 24 on a shaft 25, while the gears on the spindles 21, 22 engage with bevel gears 26 on a shaft 27. The shafts 25, 27 carry gears 28, 29 engaging with a large gear 30 driven by hand by means of a handle 31. The gear 28 is fixed to the shaft 25, so that rotation of the handle 31 always drives the shaft 25. The gear 29 is free on the shaft 27, but may be secured thereto by means of a clutch 32 operated by a small hand wheel 33. A second hand wheel 34 is provided by means of which, when the gear 29 is disengaged from the shaft 27, the shaft 27 may be driven independently of the shaft 25, the clutch 32 serving to secure either the gear 29 or the hand wheel 34 to the shaft 27. By these means, when the gear 29 is disengaged from the shaft 27, the shafts 27, 25 may be driven independently by means of the hand wheel 34 and the handle 31 respectively. When the gear 29 is secured to the shaft 27, the shaft 25 and the shaft 27 may be driven together in synchronism by means of the handle 31. The reels 5, 6, 7, 8, are driven by a slipping frictional drive, or lightly braked, by means of spring belts 35, engaging either with pulleys 36 mounted on the spindles 19—22 or by stationary discs disposed below the pulleys 36. The reels receiving film are driven, their belts engaging the pulleys 36 while the reels delivering film are braked, their belts engaging the stationary discs. As the drive may be effected in either direction, it is necessary on reversal to change the positions (and functions) of the belts 35.

In this way the films 3, 4 may first be adjusted in any desired relationship to one another, and then driven together through the device by means of the handle 31 while the initial relationship between them is accurately maintained. Each of the films 3, 4 is guided into and out of the device by means of a pair of rollers 37, 38 mounted on sliding plates or frames 39, 40, which may be drawn back during the initial adjustment of the films so as to avoid scratching the faces of the films by relative sliding motion between them. While the films are run together through the device no relative motion takes place and the films may be run with their faces in contact.

Each of the films 3, 4 is a 45-foot strip of 35 mm. film, identically marked, and designed to facilitate the selection of four gears from a range of 71 gears having every possible number of teeth from 20 to 90. Sections of the film are shown in Figures 4 and 5, and since the films are run through the device with their emulsion faces together in order to give a clear superposed image on the screen 9, the image of one film will be inverted, as indicated in Figure 4.

Each film carries two scales 42, 43, each extending along the whole length of the film, except for a short length at each end. The scale 42 is formed by black marks on a transparent ground and is a simple logarithmic scale extending from unity at one end (as shown on the left of Figure 5) to a ratio of 20.25 at the other, this being the ratio 90×90/20×20, the greatest ratio that can be dealt with by four gears selected from the range with which the device is concerned. The scale 43 is formed with transparent wedge-shaped marks on a black ground and occupies the middle strip of each film. A mark is provided for every possible product of any two gears in the range, the mark that represents the product of two gears of 20 teeth being opposite the unity mark on the scale 42, while the mark that represents two gears each having 90 teeth is opposite the other end of the scale 42. The mark that represents any other two gears is opposite that point of the scale 42 which indicates the product of the two gears divided by 400 (20×20). The order of arrangement of the marks is therefore the order of the magnitudes of the products they represent, and for the purpose of identifying the numbers whose products are so represented it is necessary to provide a table, in order of magnitude, of every possible product and to mark the scale with numbers at intervals, say, every tenth scale mark, whereby any scale mark may be identified and the numbers whose product the scale mark represents found from the table.

Figure 4:
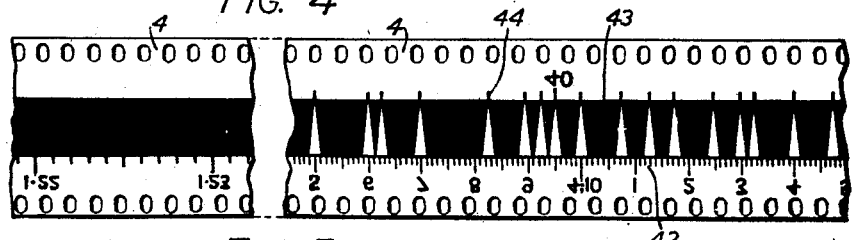
Figures 4 and 5 are views of parts of the two films employed in the apparatus shown in Figure 1.
Figure 5:
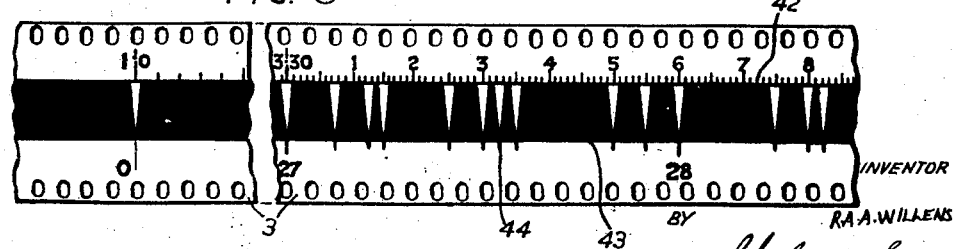

Thus in Figure 4 the one numbered scale mark, 40 is visible at the top of the strip, and in Figure 5 three numbered scale marks, 0, 27 and 28 are visible near the bottom of the strip, each figure also showing several un-numbered scale marks between and on each side of the numbered marks. Two extracts from such a table, covering the right-hand parts of Figures 5 and 4 respectively are given below:

*Extract I*

```
27  0   20×66;  22×60;   24×55;   30×44;
            33×40.
    1   21×63;  27×49.
    2   25×53.
    3   26×51;  34×39.
    4   35×38.
    5   36×37.
    6   31×43.
    7   23×58;  29×46.
    8   20×67.
    9   22×61.
28  0   21×64;  24×56;  28×48;  32×42.
    1   25×54;  27×50;  30×45.
    2   26×52.
    3   33×41.
    4   23×59.
```

*Extract II*

```
    3   20×81;  27×60;  30×54;  36×45.
    4   28×58;  29×56.
    5   25×65.
    6   22×74;  37×44.
    7   23×71.
    8   24×68;  32×51;  34×48.
    9   38×43.
40  0   21×78;  26×63;  39×42.
    1   20×82;  40×41.
    2   31×53.
    3   35×47.
    4   27×61.
    5   22×75;  25×66;  30×55;  33×50.
    6   28×59.
    7   23×72;  24×69;  36×46.
    8   21×79.
    9   20×83.
41  0   26×64;  32×52.
    1   37×45.
    2   34×49.
```

In the operation of the device one film is adjusted so that the unity mark of its logarithmic scale 42 is in the field of view (as on the left-hand side of Figure 5), while the other is run past until the mark on its logarithmic scale correspondon the first film. Thus the left-hand parts of Figures 4 and 5 show the films in suitable position (though not, as they would be, superposed) for a desired ratio of 1.22506, the right-hand parts of the film being in the corresponding relationship. The final adjustment of this setting will, of course, be made by the hand wheel 34. When the setting is exact, the sprockets driving the two films are firmly clutched to one another by means of the hand wheel 33 and the films are then driven together through the device by means of the handle 31. The part of the film on the screen 9 corresponding to each of the simple logarithmic scales 42 is masked by means of the hinged flaps 10 and 11, so that light transmitted through this part of the film does not distract the attention of the observer. In consequence of the black ground of the remaining scales 43 of the films no light will be thrown upon the exposed part of the screen 9, unless two transparent marks, one on each film, coincide. This may be observed as a flash of light crossing the screen 9. When this occurs the films are run back together until the coincidence can be seen and observed and the flaps 10, 11 are opened so that the coinciding parts can be identified. This is shown in Figure 3, and it will be seen that the flap 10 has a bright reflecting surface on its underside (the side visible in Figure 3), so that the figures on the film whose image is inverted can more easily be read.

Figure 3:
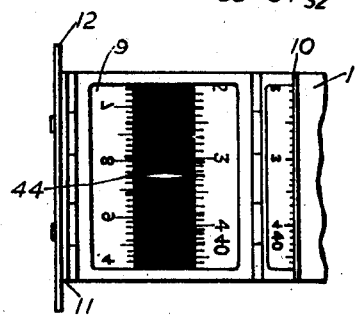
Figure 3 is a detail of Figure 1 on an enlarged scale.

From Figure 3 it will be seen that two marks do fully coincide at 44, the coincident marks, as shown in Figures 4 and 5, being those numbered 397 on the one scale (inverted) and 276 on the other scale. Reference to the table of which extracts are given above shows that these two numbers correspond respectively to the gear pairs 23 and 71 in the one case and 31 and 43 in the other, so that desired ratio is given by the four gears 23×71/31×43. These are the marks which are shown as being in line in the right hand parts of Figures 4 and 5, and also in Figure 3.

The sensitivity of the device is adjustable by means of wing nuts 50, shown in Figure 1, by means of which the film reels 5, 6 and the sprockets 13, 14 in connection with one of the films may be pressed downwards against springs surrounding their spindles, or allowed to rise under the influence of these springs. In this way the films 3, 4 are not laterally in register with one another except in the mean position but only overlap so that the tips or the bases and not the whole lengths of the wedge-shaped marks on the scales 43 coincide. At the same time, the mask 12 may be slid over the exposed part 9 of the screen to prevent light showing through the transparent part of one film and the wedge-shaped marks on the other. It will be seen from Figure 3 that if this is done the coincidence 44 will remain while any partial coincidence would be obscured and would not appear. In practice the films may be run through with the bases of the wedge-shaped marks overlapping until any coincidence is observed, the coincidence being then noted and the wing nuts 50 evenly tightened until it is obscured. The film is then run on until another coincidence is observed, which, if it occurs, will be a closer coincidence than that first noted. This coincidence is noted, and in turn obscured by the tightening of the wing nuts 50, and the film is run on again, and so on. The last coincidence to be noted in this way will give the four gears which most closely approach to the desired ratio, the earlier observations being regarded as superseded and ignored.

The device shown in Figure 6 is one in which the scales are marked on helices formed round cylinders. Two hollow cylinders 61, 62 are provided, both formed of thin sheet metal, the cylinder 61 sliding as a close fit inside the cylinder 62. The scale corresponding to the scale 43 in Figures 4 and 5 is formed on the upper half of each cylinder, and consists of a helical series of wedge-shaped perforations, shown on the outer cylinder 62 at 63. Although the scale of Figure 6 is too small for the shape of the perforations to be distinguished, the form of the scale, both as regards the shape and the spacing, is exactly as described with reference to the middle scales of Figures 4 and 5, the flexible scales of those figures being wound helically round the cylinder. The corresponding series of perforations on the inner cylinder 61 is, of course, concealed by the outer cylinder but is identical in form thereof, except that the wedge-shaped perforations point downwards in one case and upwards in the other (compare Figures 4 and 5). The simple logarithmic scale corresponding to the logarithmic scale 42 in Figures 4 and 5 is marked at 64 on the lower part of the inner cylinder 61. The lower edge of the outer cylinder 62 carries an index piece 65, whereby the outer cylinder may be adjusted with reference to the inner cylinder with any desired degree of displacement between the two scales 63. The several marks on the index piece 65 correspond to different degrees of sensitivity to which the device may be adjusted, for if the middle mark coincides with the helical line on which the scale 64 is based, the wedge-shaped perforations of the scale 63 coincide with the length of the corresponding perforations in the scale on the internal cylinder 61. When, on the other hand, one of the end marks on the index 65 coincides with the line on which the scale 64 is based, only the tips or the bases of the wedge-shaped perforations in the two cylinders 61, 62 overlap.

The device is illuminated by means of a long electric bulb 66 mounted inside the cylinder 61 and coiniciding approximately with the axis thereof. The bulb 66 is fed with current through a cable 67, passing through one of the handles 68, by means of which the device may be manipulated. The plain part 69 of the outer cylinder 62 serves to mask altogether the part of the perforated scale of the inner cylinder 61 which does not coincide with any part of the scale on the outer cylinder 62. Similarly the upper end of the inner cylinder 61 is blanked off so that the upper part of the scale on the cylinder 62 is not internally illuminated.

In the operation of the device the cylinders 61, 62 are adjusted relatively to one another by an axial and rotational adjustment until the edge of the index piece 65 coincides with the mark on the scale 64 corresponding to the desired ratio. The bulb 66 is then illuminated, and it may be seen, preferably by examination in a darkened room, whether any light shows through two coincident wedge-shaped perforations, one in the cylinder 61 and the other in the cylinder 62. If two perforations coincide in this manner, these are the perforations corresponding to pairs of gears which together will give the desired ratio. If several coincidences should occur, some being more accurate than others, the cylinders 61, 62 may be slid axially to the extent covered by the marks on the index pieces 65 until the less perfect coincidences are eliminated. The device shown in Figure 6, though simpler in use, may be more expensive in construction, since it depends on a considerable degree of accuracy in the marking of the scales thereon.

A device that is even simpler in construction though more difficult to use is shown in Figure 7, in which the principle of the present invention is applied, as it were, twice in series. This device comprises four scales 70, 71, 72, 73, all identical in form and having one mark for each of the 71 gears in the range to be dealt with. The distance of each mark from the left-hand mark of the scale is proportional to the logarithm of the number of teeth in the corresponding gear divided by 20 (the latter figure being the number of teeth in the smallest gear). The device is in the form of a slide rule, and at the bottom of the rule is a fifth scale 75, which is a simple logarithmic scale extending from unity to a ratio of 20.25, this scale thus being twice as long as each of the scales 70 to 73. The scales 70 and 75 are fixed with reference to one another and the scales 71 and 72 are fixed with reference to one another. The scale 73 is capable of sliding, so that its left-hand mark coincides with a mark on the scale 75 selected to correspond to the desired ratio. The scales 71, 72 may then be slid together with reference to the scales 70 and 73, and when, simultaneously, a mark on the scale 70 coincides with a mark on the scale 71, while a mark on the scale 72 coincides with a mark on the scale 73, the four marks involved together will give a compound gear ratio corresponding to the displacement between the scales 73, 75. In the structure of the slide rule shown in Figure 7 the scales 71, 72 are prevented from sliding out of engagement with the scale 73 by means of a pin 76 running in a groove 77 in a base plate 78 secured to or formed integral with the scale 73. The scale 73 and base plate 78 extend sufficiently far beyond the marks on the scale 73 at each end to permit the scales 71, 72 any degree of adjustment within which coincidence may occur between marks on the scale 72 and marks on the scale 73.

The device well illustrates the principle of the present invention, though in practice its greatest utility would be to check the fact that four given gears, selected for example by the device shown in Figure 6, do, in fact, combine to give a desired ratio.

Having described my invention, what I desire to secure by Letters Patent is:

1. A calculatng device comprising a plurality of mutually adjustable scales having transparent scale marks on an opaque ground, said scales being arranged in superposition and adapted to be observed by light transmitted through them whereby the scale marks of each are obscured by the ground of the other except where the scale marks of one coincide with those of the other.

2. A calculating device for facilitating the selection of a set of at least two pairs of gears from a range of gears to give a gear train having a compound gear ratio approximating as closely as possible to a desired ratio, said device comprising two mutually adjustable opaque scales, one of said scales being marked with transparent scale marks, each at a distance from a datum proportional to the logarithm of the product of the numbers of teeth in some selection from said range of the odd gears of said train, all such selections being represented, the other scale being marked with transparent marks each at a distance from a datum proportional to the logarithm of the product of the numbers of teeth in some selection of the even gears of said train, all such selections being represented, said scales being arranged in superposition and adapted to be observed by light transmitted through them whereby the scale marks of each are obscured by the ground of the other except where the scale marks of one coincide with those of the other.

3. Device according to claim 2 adapted for the selection of two pairs of gears, each scale involving two of the four gears of the train.

4. Device according to claim 1, comprising means for directing light through the superposed scales.

5. Device according to claim 1, comprising a strip of cinematographic film for each scale and a film-viewing device for inspecting the scales in superposition.

6. Device according to claim 1, comprising a strip of cinematographic film for each scale and a film-viewing device for inspecting the scales in superposition, said film having uniformly spaced perforations at its edges serving as units of length for the marking of said scales and for the purpose of keeping the two films in correct mutual adjustment in said film-viewing device.

7. Device according to claim 1, comprising two cylinders, one fitting inside the other, the scales being formed, one on each cylinder, as a helical series of perforations.

8. Device according to claim 1, comprising an additional scale associated with at least one of the scales and fixed in relation thereto, for the purpose of facilitating the desired mutual adjustment of the scales.

9. Device according to claim 1, wherein the transparent scale marks on each scale are wedge-shaped and point across the scales in opposite directions, said device comprising means for adjusting the scales laterally with respect to one another so as to vary the degree to which the superposed scales overlap.

10. A calculating device for selecting two pairs of gears from a range of gears to give a train of four gears having a compound gear ratio approximating as closely as possible to a desired ratio, said device comprising two strips of opaque cinematograph film each having uniformly spaced perforations at its edges, a film-viewing device for inspecting said strips of film in superposition, and means in said film-viewing device for laterally adjusting said strips so as to vary the degree to which they overlap, each of said strips being marked with transparent wedge-shaped scale marks pointing across the films in opposite directions in the two scales, each scale mark being disposed at a distance from a datum proportional to the logarithm of the product of the number of teeth in two gears selected from said range, each possible pair of gears being represented on each scale, one of said scales being provided with an additional scale fixed relatively thereto and being a plain logarithmic scale to facilitate the longitudinal adjustment of the strips of film, said perforations serving as units of length for the marking of said scales and for the purpose of keeping the two films in correct displacement relatively to one another in said film-viewing device.

11. A calculating device for selecting two pairs of gears from a range of gears to give a train of four gears having a compound gear ratio approximating as closely as possible to a desired ratio, said device comprising two cylinders one fitting inside the other, each cylinder having a helical series of wedge-shaped perforations pointing parallel to the axis of said cylinders but in opposite directions in the two cylinders, each of said marks being disposed at an angular distance from a datum proportional to the logarithm of the product of the numbers of teeth in a pair of gears selected from said range, each such pair being represented on each scale, one of said cylinders having a plain logarithmic scale helically marked thereon to facilitate the adjustment of said two series of perforations relatively to one another, and a source of light within the cylinders.

ROBERT ALFRED ARCHIBALD WILLENS.